(12) United States Patent
Siala et al.

(10) Patent No.: US 6,947,373 B2
(45) Date of Patent: Sep. 20, 2005

(54) METHOD FOR OPTIMAL ESTIMATION OF A PROPAGATION CHANNEL BASED SOLELY ON PILOT SYMBOLS, AND CORRESPONDING ESTIMATOR

(75) Inventors: Mohamed Siala, Ariana (TN); Emmanuel Jaffrot, Paris (FR)

(73) Assignee: France Telecom, Paris (FR)

( * ) Notice: Subject to any disclaimer, the term of this patent is extended or adjusted under 35 U.S.C. 154(b) by 796 days.

(21) Appl. No.: 09/951,450

(22) Filed: Sep. 14, 2001

(65) Prior Publication Data

US 2003/0016645 A1 Jan. 23, 2003

(30) Foreign Application Priority Data

Sep. 14, 2000 (FR) ............................................ 00 11715

(51) Int. Cl.$^7$ .................... H04J 11/00; H04B 7/216; H04B 7/212
(52) U.S. Cl. .................. 370/208; 370/342; 370/347
(58) Field of Search ................................. 370/203, 208, 370/210, 342, 347

(56) References Cited

U.S. PATENT DOCUMENTS

| | | | | |
|---|---|---|---|---|
| 6,188,717 | B1 | * | 2/2001 | Kaiser et al. ............... 375/148 |
| 6,611,551 | B1 | * | 8/2003 | Jones et al. .................. 375/219 |
| 6,650,616 | B2 | * | 11/2003 | Crawford .................... 370/203 |
| 6,768,713 | B1 | * | 7/2004 | Siala et al. .................. 370/203 |

OTHER PUBLICATIONS

E. Jaffrot, et al., Proceedings of 2000 International Conference on Acoustics, Speech and Signal Processing, vol. 5, pp. 2977–2980, "Turbo Channel Estimation for OFDM Systems on Highly Time and Frequency Selective Channels", Jun. 5, 2000.

M. Siala, et al., IEEE VTS 50$^{th}$ Vehicular Technology Conference, vol. 1, pp. 466–470, "Semi–Blind Maximum a Posteriori Multipath Fast Fading Channel Estimation for TDMA Systems", Sep. 19, 1999.

M. Siala, et al., Annales des Telecommunications, vol. 54, No. 3–4, pp. 243–254, "Iterative Rake Receiver With Map Channel Estimation for DS–CDMA Systems", Mar. 1999.

A. A. Hutter, et al., IEEE VTS 50$^{th}$ Vehicular Technology Conference, vol. 1, pp. 305–309, "Channel Estimation for Mobile OFDM Systems", Sep. 19, 1999.

Y. Zhao, et al., IEEE 47$^{th}$ Vehicular Technology Conference, vol. 3, pp. 2089–2093, "A Novel Channel Estimation Method for OFDM Mobile Communication Systems Based on Pilot Signals and Transform–Domain Processing", May 4, 1997.

* cited by examiner

Primary Examiner—Duc Ho
(74) Attorney, Agent, or Firm—Oblon, Spivak, McClelland, Maier & Neustadt, P.C.

(57) ABSTRACT

Method for optimal estimation of a propagation channel based solely on pilot symbols. A base of natural vectors is formed using the correlation matrix of the channel observed solely at the positions of the pilot symbols. Channel representation is broken down in this base. The base vectors are extended to the data symbols, which allows optimal interpolation of channel estimation to the data symbols. Application to OFDM, TDMA and CDMA systems.

8 Claims, 5 Drawing Sheets

METHOD FOR OPTIMAL ESTIMATION OF A PROPAGATION CHANNEL BASED SOLELY ON PILOT SYMBOLS, AND CORRESPONDING ESTIMATOR

TECHNICAL FIELD

The object of the present invention is an optimal estimation method for a propagation channel based solely on pilot symbols, and a corresponding estimator. It finds application in wireless communications, in particular for multiple access and modulation techniques of OFDM type (Orthogonal Frequency Division Multiplexing") [1], [2], [3], TDMA type (Time Division Multiple Access) or CDMA type (Code Division Multiple Access). It may be applied, among others, to the HIPERLAN II, DAB [2] and DVB-T [3] systems for OFDM, to IRIDIUM (Registered Trademark) and ICO for TDMA, and to UMTS and CDMA-2000 for CDMA.

PRIOR ART

Current digital communication systems may be divided into three main categories:
- multicarrier OFDM Systems with, among others, the HIPERLAN II, DAB and VDB-T systems;
- time division multiple access systems (TDMA) with, among others, the GSM and DECT systems for terrestrial wireless communications and the IRIDIUM (Registered Trademark) and ICO systems for satellite links.
- conventional CDMA systems, for example the IS'95, UMTS and CDMA-2000 systems for terrestrial wireless communications and the GLOBALSTAR system (Registered Trademark) for wireless communications by satellite and in time.

In all these systems, the solving of reception problems related to knowledge of propagation channel characteristics is facilitated through the introduction of pilot symbols (or reference symbols) or common pilot channels, known in advance by each receptor.

The following description emphasizes the OFDM multi-carrier system, but the invention also applies to single-carrier systems, namely:
- conventional continuous transmission systems with a propagation channel that is not or only scarcely frequency selective,
- TDMA transmission systems with no frequency hopping, with a propagation channel that is not or only scarcely frequency selective,
- TDMA transmission systems with frequency hopping, with a propagation channel that is not or only scarcely frequency selective,
- CDMA transmission systems with a propagation channel which may or may not be frequency selective, and
- OFDM transmission systems with a propagation channel possibly being highly frequency and time selective.

In all these cases, modelling of the transmitted and received signal always corresponds to a particular modelling case which will be described below in respect of the OFDM system.

a) OFDM Systems

The OFDM systems belonging to the first category use multicarrier modulation with which it is possible to divide users in the time-frequency plane. They allow high signal rate transmission without having recourse to equalizers. They are widely used in broadcasting contexts such as DVB-T and DAB, and mobile radio contexts such as RIP-ERLAN II.

The basic principle of OFDM is to produce a certain number of narrow band signals all orthogonal to one another. These orthogonality properties are then used by each receiver to recover the corresponding transmitted data. A typical embodiment of an OFDM system uses an inverse discrete Fourier transform (IDFT) for transmission and a discrete Fourier transform (DFT) for reception.

Figure 1:
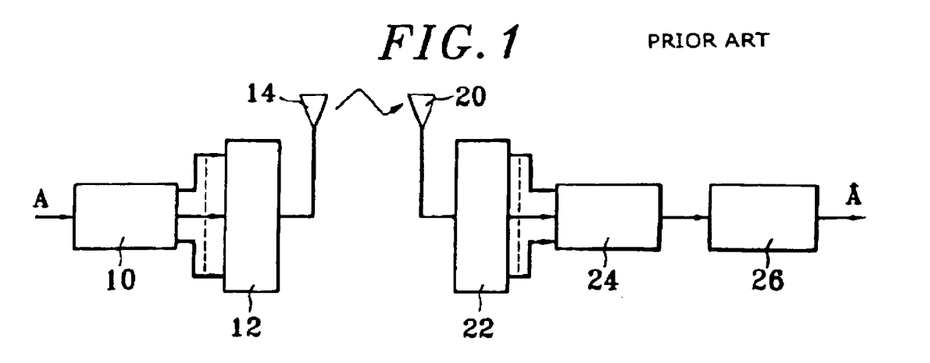
FIG. 1, already described, shows a conventional OFDM transmission chain with a single sensor.

FIG. 1 appended illustrates a conventional OFDM transmission chain with a single sensor. This chain comprises a series-parallel conversion circuit 10 receiving signals A, an inverse discrete Fourier transform circuit 12, transmission means 14, reception means 20, a Fourier transform circuit 22, a parallel-series converter 24 and finally decision means 26 which deliver estimated symbols Â

A conventional OFDM modulator processes the data stream in blocks. It manages this stream in sequences of N symbols and performs their inverse Fourier transform. This amounts to saying that this transform generates N subcarriers, each one conveying one of the symbols of the initial sequence. This block, called OFDM symbol, may contain both data symbols and pilot symbols used for channel synchronization and estimation needs. Unlike conventional CDMA or TDMA signals, OFDM often requires distribution of the pilot symbols over the entire time-frequency plane.

The mobile radio channel that is crossed during communication between a transmitter and a receiver is generally of multipath type with fast Rayleigh fading. This phenomenon is generally due to the combination of mobile movement and propagation of the radioelectric wave along several paths. It may also be artificially produced by a "1" broadcasting pattern used for the digital DVB-T broadcasting system (which in theory is impossible to achieve with analogue television broadcasting).

Figure 2:
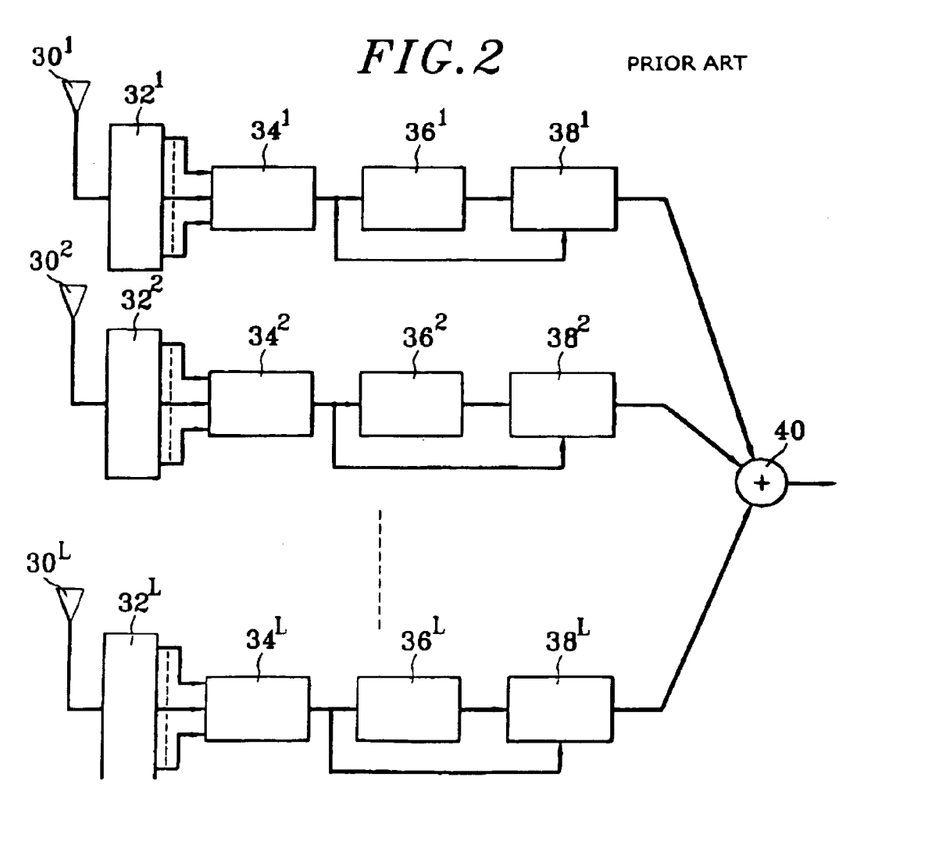
FIG. 2, already described, shows a conventional OFDM receiver with several sensors and L diversity branches.

The receiver can be equipped with L sensors providing L diversity branches as shown in FIG. 2 appended. In this figure, the receiver comprises L sensors $30^1, 30^2, \ldots, 30^L$, L Fourier transform circuits $32^1, 32^2, \ldots, 32^L$, L parallel-series converters $34^1, 34^2, \ldots, 34^L$, L channel estimation circuits $36^1, 36^2, \ldots, 36^L$, L phase restoration circuits $38^1, 38^2, \ldots, 38^L$ and an additioner 40 delivering the outgoing weighted values of the symbols to be estimated.

From a receptor viewpoint, after demodulation, the channel affecting a time-frequency block may be represented in the form of a time-frequency matrix, or of a surface in the time-frequency-amplitude space. The problem is therefore treated in a bidimensional space, unlike with TDMA where the problem is unidimensional.

Channel estimation is based on the use of pilot symbols. The latter make it possible to directly obtain an estimation of the channel of each diversity branch at the pilot sites for interpolation or extrapolation allowing estimation of the, channel affecting the data symbols.

b) TDMA Systems

The TDMA systems, belonging to the second category are currently limited to the treatment of two extreme cases: channels that are highly frequency selective (substantial spreading of delays) but not time selective (negligible Doppler spread), and channels that are not frequency selective but which may possibly be very time selective. The first case is often encountered in terrestrial wireless communication systems such as GSM. The second is rather more found in satellite wireless communication systems such as ICO and IRIDIUM.

c) CDMA Systems.

The CDMA systems belonging to the third category introduce the notion of power control period (PCP). The power of the signal sent by the transmitter remains constant throughout each PCP, but may vary from one PCP to another to counter slow fading (due to loss of propagation in space and masking effects) and fast fading due to multipath effects (time selectivity).

The conventional receiver of a CDMA system first carries out adaptive filtering of the signal received. The signal so obtained then undergoes dispreading and is continued for each of the paths of significant power selected by the receiver. Each path is then estimated at each PCP by correlation of the pilot symbols with despread samples associated both with this path and with this PCP. This estimation is then used in the remainder of the PCP to demodulate the data symbols of each path and recombine them for the decision to be taken. This is the principle of the so-called RAKE receiver.

With slow movement of the terminal, and hence low time selectivity, path estimation for a given PCP may be consolidated by weighting with those of a finite number of neighbouring PCPs.

Disadvantages of Prior Techniques

The channel observed by the receiver may vary significantly from one time-frequency block to the other with OFDM, from one time interval to the other with TDMA, and from one power control period to the other with CDMA. For the three categories of multiple access under consideration, this variation is mainly due to the changes in propagation conditions between the transmitter and the receiver. However, with OFDM, this variation may be further accentuated in frequency with the artificial increase in delay spreading $T_m$ caused by the use of a "1" broadcasting pattern (in particular as with the DVB-T system).

With OFDM, the variable nature of the channel may be characterized by the sum $B_d T_m$, in which $B_d$ represents the Doppler spread. The greater this sum, the faster the channel variation in the time and frequency domains. With TDMA and CDMA, this variable nature may be characterized by the sum $B_d T_s$, where $T_s$ represents the duration of a symbol. The greater this sum, the faster the channel variation in time.

The reception methods prior to the invention do not seek to optimize channel estimation. They go no further than making channel estimation at the positions of the pilot symbols, then extending this estimation to the data symbols through linear interpolation. Five methods routinely used for OFDM systems are described below. These methods have their counterpart in the TDMA and CDMA systems.

i) First Method

In the first method, the three pilot symbols the nearest to the data symbol at which the channel is to be estimated are taken into account. The plane passing through the three pilot symbols is calculated and channel estimation is deduced at the point under consideration. Even if heed is paid to Nyquists's sampling theorem, regarding the concentration and positioning of the pilot symbols in the time-frequency plane, this method still remains sensitive to strong channel variations and does not allow efficient reduction of effects due to thermal noise.

ii) Second Method

A second method uses a simple form of the MMSE criterion ("Minimum Mean Square Error"). It consists of identifying the constant plane by averaging the channel values at the pilot symbols and deducing a constant estimation in time and frequency of the channel affecting the transmitted data. This channel modelling is well adapted to channels which vary little at each received block and therefore having relatively low $B_d T_m$ sums. However, as soon as the channel becomes more selective, plane modelling shows its limits on account of the notable bias affecting the channel estimates at the data symbols.

iii) Third Method

A third method also uses another form of the MMSE criterion but this time by searching for a non-constant channel estimation plane. This method is therefore better adapted to channels which vary slowly, but remains less suitable than the second method for almost constant channels.

iv) Fourth Method

A fourth method is based on the use of a bidimensional discrete Fourier transform. Out of the received time-frequency block received only those samples are preserved which correspond to the pilot symbols at the positions they occupy in the block. All the other positions, associated with the data symbols, are reset to zero. A bi-dimensional discrete Fourier transform is then performed on this modified block. This is followed by filtering to insulate the channel space from the total information obtained in the Doppler-delay plane. And finally an interpolation is made on the entire block by an inverse bidimensional discrete Fourier transform. This technique has adverse edge effects and is therefore not adapted to small-sized blocks.

v) Fifth Method

A fifth method consists of channel representation by the natural vectors of its correlation matrix. However, the projection of the signal received on the base of the natural vectors is not optimised since the restriction of the natural vectors to the pilot symbols does not form an orthogonal base.

The first three methods are adapted to very specific propagation cases, but not at all to time and frequency selective channels. The last two methods may be used for time and frequency selective channels but soon show their limits with high $B_d T_m$ values.

The purpose of this invention is precisely to overcome these disadvantages.

DISCLOSURE OF THE INVENTION

Unlike the prior methods, the method put forward by the invention is based on an optimal estimation of a channel, optionally one that is very time and/or frequency selective, made by modelling its evolution in time and frequency. With this approach it is possible to use the pilot symbols of neighbouring blocks with no bias being introduced even for channels varying significantly from one block to the next. Advantage may therefore be taken of the efficacy of this approach to better combat channels that are increasingly time and frequency selective, by reducing the number of pilot symbols or by reducing their power.

The purpose of the present invention is to improve the performances of current or future OFDM, TDMA and CDMA systems. This improvement, achieved through optimisation of channel estimation, allows for a considerable increase in the capacity and coverage of these systems. It is generated by optimisation of conventional receiver functioning for slow fading, but also for the more difficult case of very fast fading. It is further increased if the pilot symbols are judiciously divided in time for the TDMA and CDMA systems and in time-frequency for the OFDM systems.

It is then possible to thwart performance deterioration caused by rapid variation in time (for TDMA and CDMA) or in time-frequency (for OFDM) of the channel on each block received. It is also possible to make advantageous use of the pilot symbols of neighbouring blocks with OFDM, of neighbouring time intervals with TDMA or of neighbouring power control periods with CDMA, for channel estimation with no bias introduction.

One purpose of the invention is to improve the quality of information received by applying an optimal channel estimation method to OFDM, TDMA or CDMA systems. This method may be used irrespective of the manner in which the pilot symbols are introduced or distributed in the stream of transmitted information.

With the invention it is possible, at constant reception quality, to reduce the relative number and/or the power of the pilot symbols. This purpose is achieved by optimally taking into account a random number of pilot symbols of time-frequency blocks or consecutive time intervals for channel estimation.

The invention may also be used in autonomous manner. It may also be advantageously used to optimally initialise some semi-blind iterative channel algorithms (using both the pilot symbols and the data symbols) that are often very sensitive to initial conditions [4], [5], [6], [7].

With this technique it is also possible, through theoretical formulation of performance, to optimise the position of the pilot symbols in the time-frequency blocks through exhaustive search.

More precisely the subject of the invention is an optimal estimation method for a propagation channel in which:

a signal is received which passed through said channel, this signal containing blocks of symbols either monodimensional in time or frequency, or bidimensional in time and frequency, each block containing N digital symbols with $N_P$ pilot symbols and $N_D$ data symbols, the signal received is modelled by a signal vector denoted R having N components, the propagation channel is modelled by a multiplicative discrete channel vector C having N components, from the signal vector R an estimation $\hat{C}$ is deduced of the discrete channel vector C, this method being characterized in that:

for each block transmitted, using signal vector R a restriction vector $R_p$ of this vector is calculated restricted to the $N_p$ pilot symbols, using the multiplicative discrete channel vector C, a restriction vector $C_p$ is defined restricted to the pilot symbols, an orthogonal base $\{B_{Pl}\}_{l=0}^{N_P-1}$ is defined, formed of the $N_p$ natural vectors of covariance matrix H of the restriction vector $C_p$ of the discrete channel, said matrix having $N_p$ natural values denoted $\Gamma_l$ (l=0, 1, 2, ..., $N_p$-1), the restriction vector $R_p$ of the signal received is broken down in said orthonormal base $\{B_{Pl}\}_{l=0}^{N_P-1}$ and $N_p$ components Gl are obtained ($G_l = B_{Pl}^{*T} R_p$ where l=0, 1, ..., $N_{p-1}$), the orthonormal base $\{B_{Pl}\}_{l=0}^{N_P-1}$ is extended to data symbols $N_D$ to obtain an extended base $\{B_l\}_{l=0}^{N_P-1}$ the desired optimal estimation $\hat{C}$ is obtained of the equivalent channel vector C by calculating the sum $$\sum_{l=0}^{N_p-1} w_l G_l B_l$$

in which the $w_l$ are $N_p$ weighting factors defined by $1/(1+N_0/\Gamma_l)$ in which $N_0$ is the noise variance.

A further subject of the invention is an estimator which comprises means able to fulfil the functions of method so defined.

BRIEF DESCRIPTION OF THE FIGURES

FIGS. 8A and 8B show the optimal positions in time and frequency of the pilot symbols for $B_dT_m=(1/32)^2$ and $\bar{E}/N_0=10$ dB; in FIG. 8A the likelihood of binary error is average; in FIG. 8B it is the worst;

DETAILED DESCRIPTION OF PARTICULAR EMBODIMENTS

The invention will be described solely with respect to OFDM multicarrier modulation. This description can easily be extended to other single-carrier modulations of TDMA or CDMA type. It is to be specified however that for the CDMA systems, the outgoing signals from the prongs of a rake receiver play an identical role to the outgoing signals from multisensor systems with independent channels that are not frequency selective. The proposed invention addresses the more general framework of multisensor systems with channels that are both time and frequency selective.

The principle of the invention illustrated here in respect of OFDM, consists of using the samples of pilot symbols contained in the received signal to make an optimal estimation of the corresponding multipath channel.

The OFDM receiver obtained carries out block by block processing whenever a given number of OFDM symbols is available. It makes an optimal channel estimation only using pilot symbols. This method is optimal in the meaning of the Maximum a Posteriori (MAP) criterion. It may be simply reformulated using appropriate weighting of the projections of the samples received corresponding to the pilot symbols to an extended orthonormalised base. This base is obtained through extension of the Karhunen-Loève orthogonal breakdown of the pilot symbols to the remaining data symbols.

This method may be applied such as it is to obtain a channel estimation solely based on the pilot symbols. It may also be used as initialisation phase of a semi-blind iterative channel estimator taking into consideration the samples of data symbols. It may evidently be used for a multisensor system by placing said estimator behind each of the sensors.

In more precise manner, optimisation of OFDM receiver operation is obtained through the use of an estimator of multipath channels with Rayleigh fading solely based on pilot symbols. The optimal structure of the estimator is based on the representation of the channel obtained using Karhunen-Loève's theorem for orthogonal breakdown. Unlike other methods using this breakdown, the method of the invention uses the natural vectors of the correlation matrix of the channel observed solely at the positions of the pilot symbols. This makes it possible to obtain a set of orthogonal vectors at the positions of these pilot symbols. These vectors are then suitably extended to the data symbols, so that optimal interpolation can be made of channel estimation to the data symbols. With this technique it is also possible, through theoretical formulation of performance, to optimise the position of the pilot symbols in the time-frequency blocks by exhaustive search.

i) Representation of the Transmitted OFDM Signal

In the example taken, it is assumed that the proposed receiver has L independent diversity branches with L sensors (or receiving, antennae) that are sufficiently spaced. This receiver processes the signals received in these branches block by block. The size of each treated block does not necessarily depend upon the number of carriers of the OFDM system and may take into account all or part of one or more OFDM symbols. The shape and size of the block treated at reception is free, so that it can best adapt to the system.

Channel estimation is made block by block for each of the diversity branches taken separately. A block is made up of N symbols $a_{mn}$ of energy $E_{mn}$ and of bidimensional position $P_{mn}=(mF,nT)$ where F and T are respectively the frequency and time spacings between two adjacent symbols (with TDMA and CDMA, each symbol is identified by a single index n and has a monodimensional position in time nT). Each block is made up of $N_D$ data symbols indexed in the $S_D$ group and $N_P$ pilot symbols indexed in the group $S_P$.

ii) Characteristics of the Multipath Channel with Fading

The multipath channel associated with each diversity branch observed by the transmitted OFDM signal shows time and frequency variations due to the Doppler effect and multipath effects. Each path is characterized by an average power and a Doppler power spectrum (DPS) dependent both upon the environment and on the speed of the mobile.

The multipath channel of each branch is globally characterized by its time-frequency autocorrelation function $\phi$ ($\Delta f, \Delta t$), where $\Delta f$ is the frequency spacing and $\Delta t$ is the time spacing.

By way of example, the time-frequency autocorrelation function of a channel with a conventional Doppler spectrum and with an exponential multipath profile intensity of average power observed on a diversity branch is given as:

$$\phi(\Delta f, \Delta t) = \phi(0,0) \frac{Jo(\pi B_d \Delta t)}{1 + j2\pi T_m \Delta f}$$

in which $T_m$ and $B_d$ respectively represent delay spread and Doppler spread and $J_{0(.)}$ denotes the Bessel function of first order species O.

iii) Modelling of the Signal Received

The signal received from each diversity branch is firstly demodulated by a discrete Fourier transform (DFT). It is assumed that the signal received from the $j^{th}$ branch corresponding to the symbol $a_{mn}$ is written:

$$R_{mn}^j = c_{mn}^j a_{mn} + N_{mn}^j$$

in which $c_{mn}^j$ is the gain factor of the discrete channel of the $j^{th}$ branch observed by the symbol $a_{mn}$, and $N_{mn}^j$ is a complex additive white Gaussian noise of variance $N_0$. The gain factors within one same diversity branch are correlated to one another in time and frequency. However, the gain factors belonging to different diversity branches are decorrelated between one another.

The purpose of the invention is to estimate the gain factors $c_{mn}^j$ of the channels of all the diversity branches and to optimise the positions (mF,nT), of the pilot symbols.

To simplify the notations, the indexing function $\delta(k)$ is inserted between the monodimensional group $\{k\}_{k=0}^{N-1}$ and the bidimensional indexing group $S=S_D \cup S_P$. The indexing function $\delta_p$ is also inserted between the monodimensional group $\{k\}_{k=0}^{N-1}$ and the bidimensional indexing group Sp corresponding to only the pilot symbols. Finally, the indexing function $\delta_D(k)$ is inserted between the monodimensional group $\{k\}_{k=0}^{N-1}$ and the bidimensional indexing group $S_D$ corresponding to only the data symbols.

Let $(.)^T$ be the transposing operator. For each block transmitted the insertion is made both of the signal vector leaving the adapted filter of the $j^{th}$ branch:

$$R^j = (R_{\delta(0)}^j, R_{\delta(1)}^j, \ldots, R_{\delta(N-1)}^j)^T$$

and its restriction at the pilot symbols:

$$R_P^j = (R_{\delta_p(0)}^j, R_{\delta_p(1)}^j, \ldots, R_{\delta_p(N_P-1)}^j)^T$$

To overcome the dependence of the amplitude of each symbol $a_{mn}$ upon its index (m,n), the vector of the normalised symbols of the transmitted block is inserted:

$$A = (A_{\delta(0)}, A_{\delta(1)} \ldots, A_{\delta(N-1)})^T$$

where $A_{\delta(k)} = a_{\delta(k)}/|a_{\delta(k)}|$. With these notations, it is possible de rewrite the components of the vector received in the form:

$$R_{\delta(k)}^j = C_{\delta(k)}^j A_{\delta(k)} + N_{\delta(k)}^j$$

where $C_{\delta(k)}^j$ is the $k^{th}$ component of the equivalent multiplicative discrete channel vector:

$$c^j = (|a_{\delta(0)}|c_{\delta(0)}^j, |a_{\delta(1)}|c_{\delta(1)}^j, \ldots, |a_{\delta(N-1)}|c_{\delta(N-1)}^j)^T$$

Finally, the restriction vector is inserted:

$$C_P^j = (|a_{\delta_p(0)}|c_{\delta_p(0)}^j, |a_{\delta_p(1)}|c_{\delta_p(1)}^j, \ldots, |a_{\delta(N_p-1)}|c_{\delta(N_p-1)}^j)^T$$

of the multiplicative discrete channel equivalent to the pilot symbols.

For each block and for each diversity branch it is now sought to make an optimal estimation $\hat{C}^j$ of vector $C^j$ conditionally to the received restriction vector $R_P^j$.

Let $(.)^*$ be the complex conjugation operator. The receiver then calculates its decisions using the complex soft outgoing values:

$$\Lambda_{\delta_D(k)} = \frac{1}{N_0} \sum_{j=0}^{L-1} R_{\delta_D(k)}^j (\hat{C}_{\delta_D(k)}^j)^*, k = 0.1 \ldots, N_D - 1,$$

for those modulations with a number of factors greater than 2 (MDP4, MDP8, . . . ), or their actual parts for MDP2 modulation.

Figure 3:
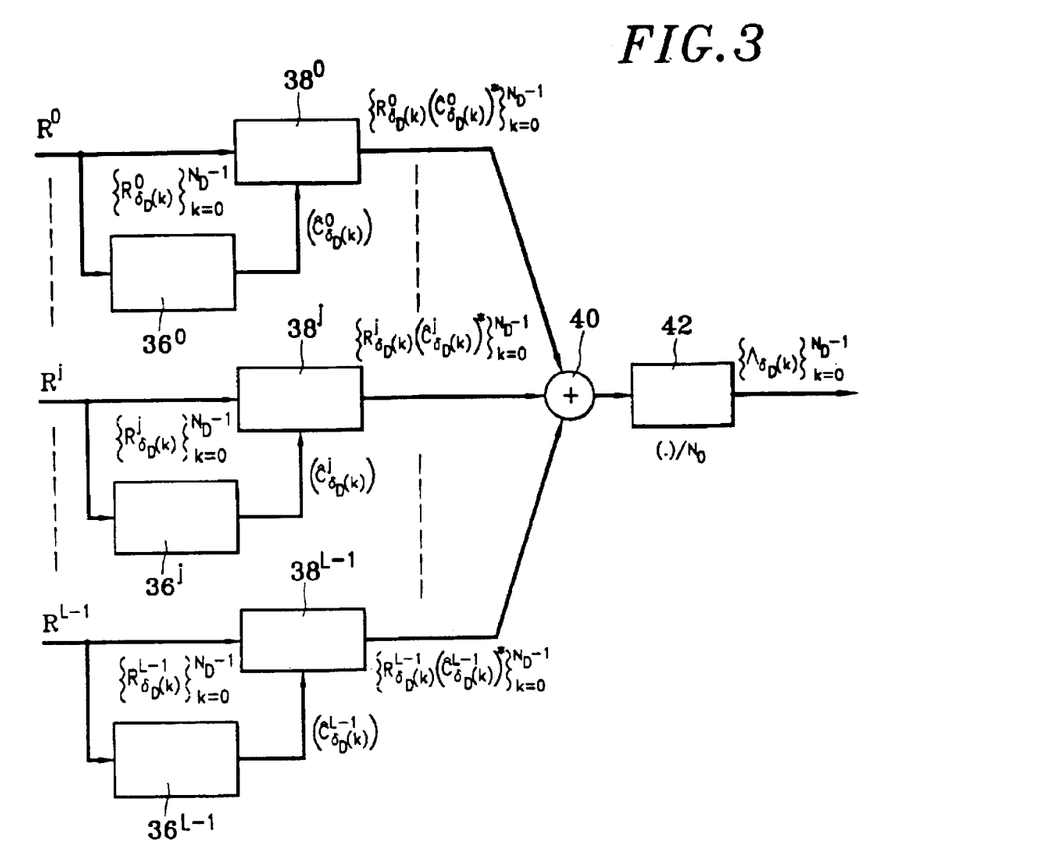
FIG. 3 illustrates the calculation of soft outgoing values for data symbols using the estimation of equivalent channels of the L diversity branches.

These operations are illustrated in FIG. 3 which shows L branches respectively receiving signals $R^0, \ldots, R^j, \ldots, R^{L-1}$, L equivalent channel estimation circuits referenced $36^1, \ldots, 36^j, \ldots, 36^{L-1}$, delivering estimations $\hat{C}_{\delta(k)}^j$, L phase restoration circuits $38^0, \ldots, 38^j, \ldots, 38^L$ delivering the sums:

$$R_{\delta_D(k)}^j (\hat{C}_{\delta_D(k)}^j)^*,$$

an additioner 40 delivering the total of the sums derived from the L phase restoration circuits, and finally a normalisation circuit 42 dividing the sum obtained by $N_0$ (noise variance) and delivering the quantity $\{\Lambda_{\delta(k)}\}_{k=0}^{N_D-1}$.

iv) Calculation of Equivalent Channel Estimation

Figure 4:
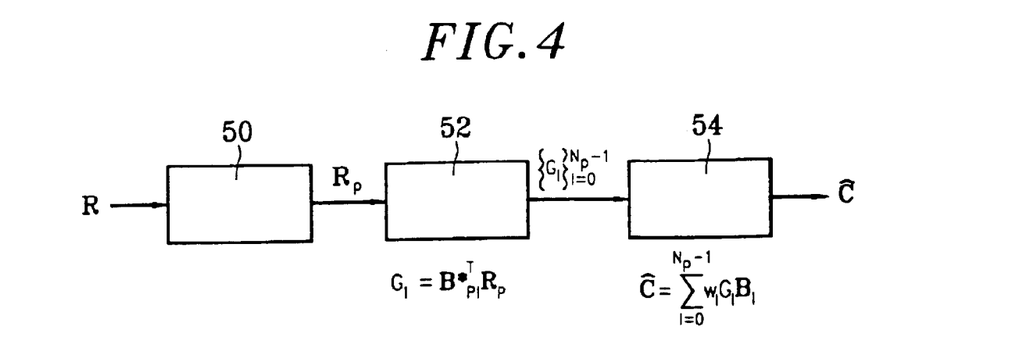
FIG. 4 shows the continuation of the processing made according to the invention for the estimation of the equivalent channel in a diversity branch.

FIG. 4 illustrates in more precise manner the operations used to estimate in optimal manner the equivalent channel for each diversity branch.

The letter R represents the signal vector received and applied to a restriction circuit 50 of this vector to only the pilot symbols. This circuit therefore delivers a vector denoted $R_p$. A circuit 52 projects this vector onto a base comprising $N_p$ vectors and denoted $\{B_{Pl}\}_{l=0}^{N_p-1}$ The projection brings forth the components:

$$G_l = B_{Pl}^{*T} R_p \ (l=0.1 \ldots, N_{P-1})$$

These $N_p$ components are applied to a circuit 54 to reconstruct a channel estimation vector denoted $\hat{C}$ which is a weighted total of the sums $G_l B_l$. Circuit 54 finally delivers the estimated channel vector $\hat{C}$.

In more precise manner, the mathematical expectancy operator is denoted E[.]. Let $H = E[C_p C_p^{*T}]$ be the covariance matrix of restriction $C_p$ to the pilot symbols of the discrete channel vector C with as $(\mu, v)^{th}$ entry:

$$H_{\mu v} = \sqrt{E_{\delta_p(\mu)} E_{\delta_p(v)}} \phi(P_{\delta_p(\mu)} - P_{\delta_p(v)})$$

where $v, v = 0.1 \ldots, N_p - 1$.

The orthonormal base made up of $N_p$ natural vectors of the hermit matrix H is denoted $\{B_{Pl}\}_{l=0}^{N_p-1}$. Let $\{\Gamma_l\}_{l=0}^{N_p-1}$ be the natural values $N_p$, assumed to be classified in decreasing order, associated with these natural vectors. These base vectors are determined (to the nearest random phase) by the equation:

$$HB_{Pl} = \Gamma_l B_{Pl}$$

Figure 5:
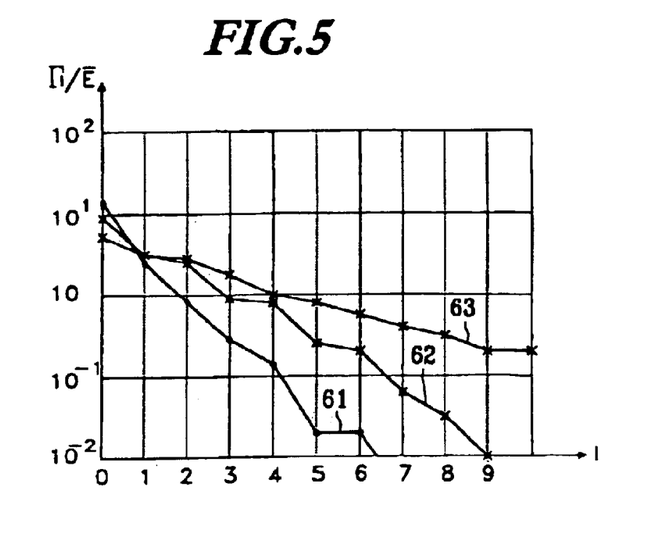
FIG. 5 shows the main normalized natural values corresponding to the positions of the pilot symbols given in FIG. 8B.
Figure 6A:
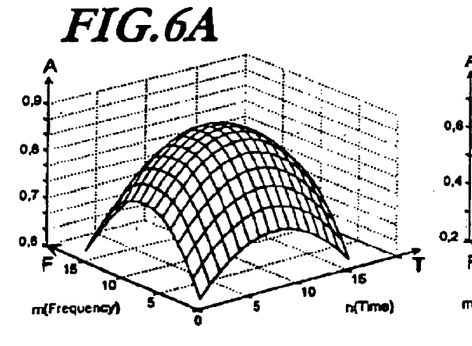
FIGS. 6A, 6B, 6C, 6D show the module of the main normalized vectors of the extended base for $B_dT_m=(1/32)^2$, for pilot symbols distributed as in FIG. 8B.
Figure 6B:
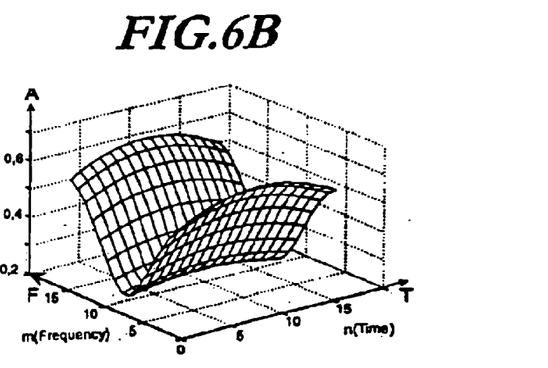
Figure 6C:
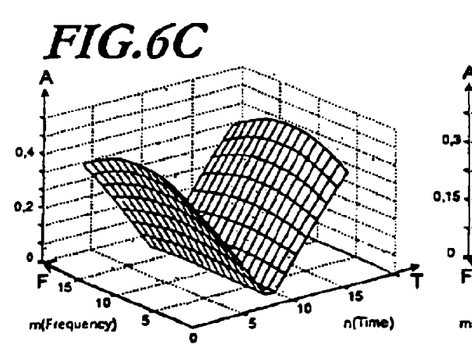
Figure 6D:
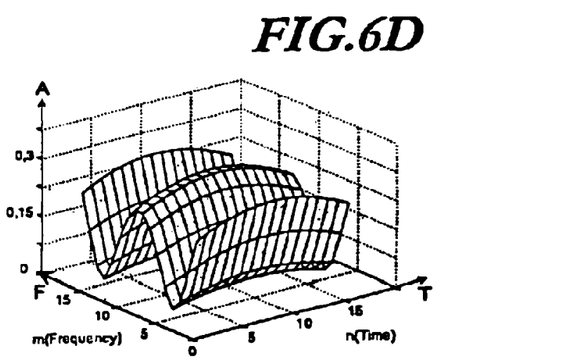

FIG. 5 shows the distribution of the most important normalized natural values $\Gamma_l / \overline{E}$ ($\overline{E}$ being the average energy received for each transmitted symbol), for the pilot symbols and data symbols having a common transmitted energy $E_{mn} = E$ and for a channel having a time-frequency autocorrelation function with a conventional Doppler spectrum and exponential multipath intensity profile.

The orthonormal base $\{B_l\}_{l=0}^{N_p-1}$ extended to the data symbols of each block is now inserted. This extended base is entirely determined from the orthonormal base $\{B_{Pl}\}_{l=0}^{N_p-1}$ using the relations:

$$B_{p\delta(k)} = \frac{1}{\Gamma_l} \sum_{v=0}^{N_p-1} \sqrt{E_{\delta(k)}} E_{\delta_p(v)} \phi(P_{\delta(k)} - P_{\delta_p(v)}) B_{l\delta_p(v)},$$

$$k = 0.1, \ldots, N-1$$

It is to be noted that the restriction to the pilot symbols of this last base re-yields the orthonormal base $\{B_{Pl}\}_{l=0}^{N_p-1}$.

FIGS. 6A, 6B, 6C and 6D show the module of the four main vectors of the extended base obtained for $B_d T_m = (1/32)^2$.

For each diversity branch, the optimal estimation $\hat{C}$ of the associated equivalent channel vector C, conditionally to the received restriction vector $R_p$, is given as:

$$\hat{C} = \sum_{l=0}^{N_p-1} w_l G_l B_l$$

where $$G_l = B_{Pl}^{*T} R_p, \ l=0,1, \ldots, N_p-1$$

represents the restriction breakdown of the received vector $R_p$, in the orthnormal base $\{B_{Pl}\}_{l=0}^{N_p-1}$, and the weighting factors $w_l, l = 0, 1, \ldots, N_p - 1$ are given by:

$$w_l = \frac{1}{1 + N_0 / \Gamma_l},$$

in which $N_0$ is the noise variance.

Figure 7:
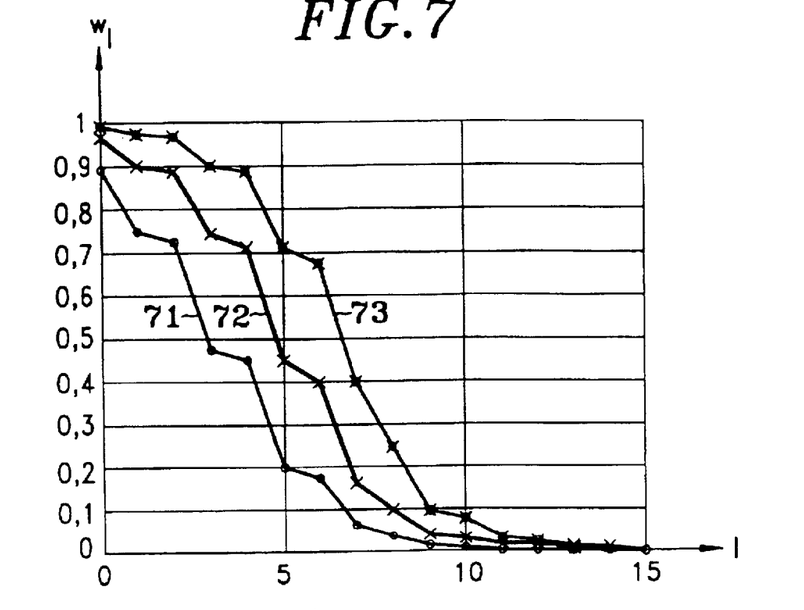
FIG. 7 shows the variation in the weighting factor for $B_dT_m=(1/32)^2$ for the pilot symbols distributed as in FIG. 8B, and for three values of the ratio $\bar{E}/N_0$.

FIG. 7 shows the changes in the main weighting factors for $B_d T_m = (1/32)^2$ and for some values of the signal to noise ratio $\overline{E}/N_0$ (0 dB for curve 71, 5 dB for curve 72 and 10 dB for curve 73).

For the propagation channels with low Doppler and delay spread, the natural values $\Gamma_l$ ($l=0, \ldots, N_p-1$) decrease very rapidly and the weighting factors $w_l$ are practically zero with the exception of the first. The estimation algorithm may then be significantly simplified by calculating the projections $G_l = B_{Pl}^{*T} R_p$ only for a few vectors of the base $\{B_{Pl}\}_{l=0}^{N_p-1}$ and by calculating the reconstruction of channel estimation $\hat{C}$ only using the corresponding vectors of the extended base.

More precisely, let $Q < N_p$ be the number of significant normalised natural values associated with weighting factors close to unit value. The estimator, in simple manner and with high precision, calculates the approximation $\tilde{C}$ of $\hat{C}$ given as:

$$\tilde{C} = \sum_{l=0}^{Q-1} w_l G_l B_l$$

in which only the coefficients $$G_l = B_{pl}^{*T} R_p, \ l=0, 1, \ldots, Q-1$$

are evaluated.

Optimal channel estimation according to the invention is solely based on the pilot symbols of a received block. It may be used as such to demodulate and restore to phase the contributions of all the diversity branches. It may also be used as optimal initialisation for several iterative algorithms for semi-blind channel estimation based on all the symbols of a received block (pilot symbols and data symbols) [4], [5], [6], [7].

v) Optimisation of the Positions of the Pilot Symbols

It is possible to determine the theoretical performance of the estimator in terms of gross binary error rate for modulations MDP2 and MDP4. It is therefore possible to quickly determine, by exhaustive search, the positions of the pilot symbols corresponding to optimal performance in terms of gross binary error rate. Among the optimisation criteria, it is possible to use the average gross binary error rate, the average being made on all the data symbols of one block. It is also possible to use the worst gross binary error rate.

For each data symbol $a_{\delta_D(k)}$, ($k=0, 1, \ldots, N_D-1$) the following vector is inserted:

$$V_k = \left(\sqrt{E_{\delta_p(0)}} \, E_{\delta_p(k)} \phi(P_{\delta_p(0)} - P_{\delta_{(k)}}), \ldots, \right.$$
$$\left. \sqrt{E_{\delta_p(N_p-1)}} \, E_{\delta_p(k)} \phi(P_{\delta_p(N_p-1)} - P_{\delta_p(k)})\right)^T$$

The identity matrix I is also inserted. For L diversity branches the gross binary error rate on symbol $a_{\delta_D(k)}$, is explicitly given as:

$$P_{e\delta_D(k)} = \frac{1}{2^L}\left(1 - \frac{1}{\sqrt{1+\mu_k}}\right)^L \sum_{l=0}^{L-1} \binom{2L-1}{l} \left(\sqrt{1+1/\mu_k} - \sqrt{1/\mu_k}\right)^l$$

in which $$\mu_k = \frac{\phi(0,0) E_{\delta_D(k)} + N_0}{V_k^{*T}(H+N_0 I)^{-1} V_k} - 1$$

for modulation MDP2, and $$\mu_k = 2\left(\frac{\phi(0,0) E_{\delta_D(k)} + N_0}{V_k^{*T}(H+N_0 I)^{-1} V_k}\right) - 1$$

for modulation MDP4.

By way of example, the optimal estimation method according to the invention may be applied to an OFDM system with square blocks of N=256 symbols. It is assumed that each block is made up of $N_p$=16 pilot symbols and of $N_D$=256−16=240 data symbols.

It is assumed that the propagation channel has a time-frequency autocorrelation function with a conventional Doppler spectrum and exponential multipath intensity profile. The hypothesis is made that the receiver has perfect knowledge of the characteristics of this channel.

Figure 8A:
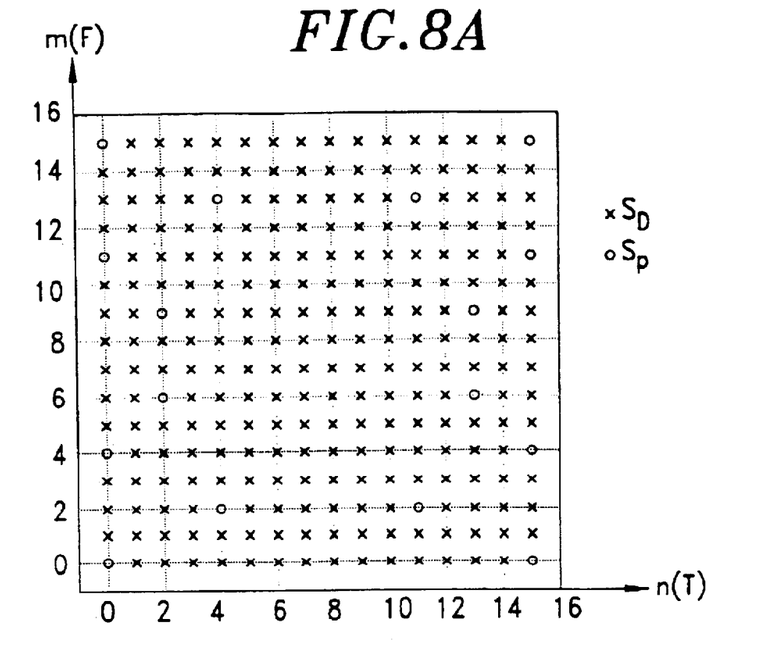
Figure 8B:
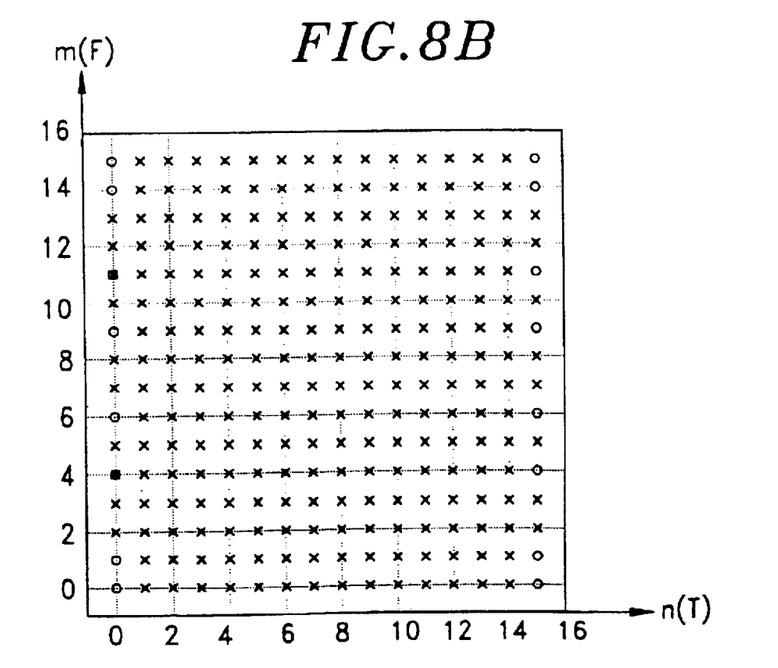

FIGS. 8A and 8B show the optimal position of the pilot symbols in each block of data for $B_d T_m=(1/32)^2$ and $\bar{E}/N_0=10$ dB. FIG. 8A shows the results obtained for the criterion of average gross binary error rate. FIG. 8B shows the same results for the worst case gross binary error rate.

Figure 9:
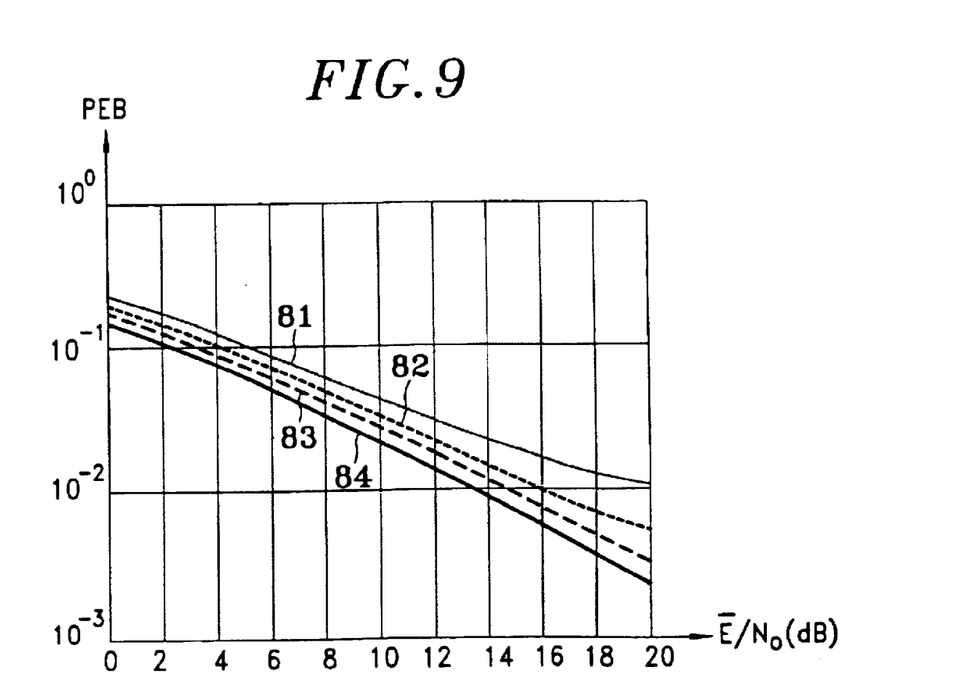
FIG. 9 shows the variations in gross binary error likelihood for several $B_dT_m$ values with a distribution of pilot symbols corresponding to FIG. 8A.

FIG. 9 illustrates the gross binary error likelihood for three values of the sum $B_d T_m=(1/16)^2$ in curve 81, $(1/32)^2$ in curve 82, $(1/64)^2$ in curve 83. By way of comparison, the same figure also shows the performances obtained with perfect channel knowledge (curve 84).

Cited Documents

[1] J. A. C. Bingham, "Multicarrier Modulation for Data Transmission, An Idea Whose Time Has Come", IEEE Communication Magazine, 28, 5, pp. 5–14, May 1990.

[2] European Telecommunications Standards Institute, "Digital Broadcast System; Digital Audio Broadcasting (DAB° to Mobile, portable and Fixed Receivers", ETS 300 401 $2^{nd}$ Edition.

[3] European Telecommunications Standards Institute, "Digital Video Broadcasting (DVD); Framing Structure, Channel Coding, and Modulation for Digital Terrestrial Television", ETS 300 744.

[4] EPO 0 802 656
[5] FR-A-2 782 585
[6] FR-A-2 782 587
[7] EN 99 11415 of 13 Sep. 1999.

What is claimed is:

1. Optimal estimation method of a propagation channel in which:
    a signal is received having passed through said channel, this signal comprising blocks of symbols either monodimensional in time or frequency, or bidimensional in time and frequency, each block containing N digital symbols with $N_p$ pilot symbols and $N_D$ data symbols,
    the signal received is modelled by a signal vector denoted R having N components,
    the propagation channel is modelled by a multiplicative discrete channel vector C having N components,
    from signal vector R an estimation $\hat{C}$ is inferred of discrete channel vector C, this method being characterized in that:
    for each block transmitted, using signal vector R, a restriction vector $R_p$ of this vector is calculated, limited to the $N_p$ pilot symbols,
    using the multiplicative discrete channel vector C, a restriction vector $C_p$ is calculated limited to the pilot symbols,
    an orthonormal base $\{B_{Pl}\}_{l=0}^{N_p-1}$ is defined made up of the $N_p$ natural vectors of the covariance matrix H of restriction vector $C_p$ of the discrete channel, said matrix having $N_p$ natural values denoted $\Gamma_l$ (l=0, 1, 2, ..., $N_p$−1),
    the restriction vector $R_p$ of the signal received in said orthonormal base $\{B_{Pl}\}_{l=0}^{N_p-1}$ is broken down and $N_p$ components $G_l$ are obtained ($G_l = B_{Pl}^{*T} R_p$ with l=0, 1, ..., $N_p$−1),
    the orthonormal base $\{B_{Pl}\}_{l=0}^{N_p-1}$ is extended to the $N_D$ data symbols to obtain an extended base $\{B_l\}_{l=0}^{N_p-1}$
    the desired optimal estimation $\hat{C}$ is obtained of the equivalent channel vector C by calculating the sum $$\sum_{l=0}^{N_p-1} w_l G_l B_l$$

in which the $w_l$ are $N_p$ weighting factors defined by $1/1+N_0/\Gamma l$) in which $N_0$ is the noise variance.

2. Method according to claim 1, in which:
    in the breakdown operation of restriction vector $R_p$ in the orthonormal base $\{B_{Pl}\}_{l=0}^{N_p-1}$, only a number Q of vectors $B_l$ are chosen from the base where $Q<N_p$, for which the associated natural values $\Gamma_l$ are greater than a given value,
    channel estimation $\hat{C}$ is only calculated with said chosen Q vectors $B_l$ (l=0, 1, ..., Q−1), which gives an approximation $\tilde{C}$ of estimation $\hat{C}$.

3. Method according to claim 1, in which the signal is transmitted via a multiple access technique by orthogonal frequency division multiplexing (OFDM).

4. Method according to claim 1 in which the signal is transmitted via a multiplexing multiple access technique by time division multiple access.

5. Method according to claim 1, in which the signal is transmitted via a multiplexing multiple access technique by code division multiple access (CDMA).

6. Method according to claim 1, characterized in that it is applied in the diversity branches of a "rake" type receiver and allows estimation of the propagation channel of each of these branches.

7. Optimal propagation channel estimator for application of the method according to claim 1, comprising:

means for receiving a signal having passed through said channel, this signal containing blocks of symbols either monodimensional in time or frequency, or bidimensional in time and frequency, each block containing N digital symbols with $N_p$ pilot symbols and $N_D$ data symbols, means for modelling the received signal by a signal vector denoted R having N components, means for modelling the propagation channel by a multiplicative discrete channel vector C having N components, means for deducing from signal vector R an estimation $\hat{C}$ of the discrete channel vector C, this estimator being characterized in that it comprises:

means, for each block transmitted and using signal vector R, for calculating a restriction vector $R_p$ of this vector limited to the $N_p$ pilot symbols, means, using multiplicative discrete channel vector C, for defining a restriction vector $C_p$ limited to the pilot symbols, means for defining an orthonormal base $\{B_{Pl}\}_{l=0}^{N_p-1}$ made up of the $N_p$ natural vectors of covariance matrix H of the restriction vector $C_p$ of the discrete channel, said matrix having $N_p$ natural values denoted $\Gamma_l$ (l=0, 1, 2, . . . , $N_{P-1}$), means for breaking down restriction vector $R_p$ of the signal received in said orthonormal base, $\{B_{Pl}\}_{l=0}^{N_p-1}$ yielding $N_p$ components $G_l$, $G_l = B_{Pl}^{*T} R_p$ with l=0, 1, . . . , $N_p-1$), means for extending the orthonormal base $\{B_{Pl}\}_{l=0}^{N_p-1}$ to the $N_p$ data symbols to obtain an extended base $\{B_l\}_{l=0}^{N_p-1}$ means for calculating the sum $$\sum_{l=0}^{N_p-1} w_l G_l B_l$$

in which the $w_l$ are $N_p$ weighting factors defined by $1/(1+ N_0/\Gamma_l)$ which forms the desired estimation.

8. Estimator according to claim 7 in which:

the means for breaking down the restriction vector $R_p$ in the orthonormal base $\{B_{Pl}\}_{l=0}^{N_p-1}$ only select a number Q of vectors $B_l$ from the base where Q<$N_p$, for which the associated natural values $\Gamma_l$ are greater than a given value, channel estimation means $\hat{C}$ only using said selected Q vectors $B_l$ (l=0, 1, . . . , Q-1), and delivering an approximation $\tilde{C}$ of estimation $\hat{C}$.

* * * * *